(12) United States Patent
Kajimoto (10) Patent No.: US 12,340,202 B2
(45) Date of Patent: Jun. 24, 2025

(54) INFORMATION PROCESSING APPARATUS THAT UPDATES PROGRAMS AND CONTROL METHOD OF THE SAME

(71) Applicant: CANON KABUSHIKI KAISHA, Tokyo (JP)

(72) Inventor: Masahiro Kajimoto, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/748,122

(22) Filed: May 19, 2022

(65) Prior Publication Data
US 2022/0382533 A1 Dec. 1, 2022

(30) Foreign Application Priority Data
May 28, 2021 (JP) ................................. 2021-090590

(51) Int. Cl.
| | | |
|---|---|---|
| *G06F 8/65* | (2018.01) | |
| *G06F 9/4401* | (2018.01) | |
| *G06F 11/07* | (2006.01) | |
| *G06F 11/14* | (2006.01) | |

(52) U.S. Cl.
CPC .............. *G06F 8/65* (2013.01); *G06F 9/4401* (2013.01); *G06F 11/1417* (2013.01); *G06F 11/1448* (2013.01)

(58) Field of Classification Search
CPC ...... G06F 8/65; G06F 9/4401; G06F 11/1417; G06F 11/1448; G06F 11/0751; G06F 11/1433
See application file for complete search history.

(56) References Cited

U.S. PATENT DOCUMENTS

| | | | | |
|---|---|---|---|---|
| 8,799,887 B2 * | 8/2014 | Suwabe | .............. | G06F 11/1433 713/172 |
| 2004/0193865 A1 * | 9/2004 | Nguyen | ................ | G06F 9/4401 713/2 |
| 2007/0050612 A1 * | 3/2007 | Chen | .................... | G06F 11/1433 713/100 |
| 2008/0120610 A1 * | 5/2008 | Katano | ..................... | G06F 8/65 717/168 |
| 2013/0007439 A1 * | 1/2013 | Yamashita | .............. | G06F 9/441 713/2 |
| 2014/0365823 A1 * | 12/2014 | Michihata | ............. | G06F 9/4401 714/16 |

(Continued)

FOREIGN PATENT DOCUMENTS

| | | | | |
|---|---|---|---|---|
| CN | 108628556 B | * 12/2021 | .......... | G06F 11/1433 |
| JP | 2019020798 A | 2/2019 | | |

*Primary Examiner* — Daxin Wu
(74) *Attorney, Agent, or Firm* — ROSSI, KIMMS & McDOWELL LLP (57) ABSTRACT

An information processing apparatus includes a first storage unit configured to store a boot program, and a backup of the boot program, and a second storage unit configured to store an updating program that is activated by the boot program and used for updating a program. A control unit executes a first updating process that updates at least the boot program by executing the updating program after executing the boot program, and executes, in accordance with completion of the first updating process, a second updating process that updates at least the backup of the boot program and the updating program after executing the updated boot program.

9 Claims, 8 Drawing Sheets

(56) References Cited

U.S. PATENT DOCUMENTS

| | | | | |
|---|---|---|---|---|
| 2016/0321057 A1* | 11/2016 | Hamakawa | ............... | G06F 8/65 |
| 2019/0384588 A1* | 12/2019 | Yagi | ................... | H04N 1/00384 |
| 2020/0401688 A1* | 12/2020 | Michishita | .............. | G06F 21/57 |
| 2022/0100489 A1* | 3/2022 | Hung | .................. | G06F 11/0757 |
| 2022/0284103 A1* | 9/2022 | Eguchi | .................. | G06F 21/572 |

* cited by examiner

INFORMATION PROCESSING APPARATUS THAT UPDATES PROGRAMS AND CONTROL METHOD OF THE SAME

BACKGROUND OF THE INVENTION

Field of the Invention

The present invention relates to an information processing apparatus such as an image forming apparatus, and a control method of the same.

Description of the Related Art

When an image forming apparatus is powered on, a program called bootloader first starts operation, and performs register setting of various types of hardware and the like. Subsequently, when activated in a normal mode, processing is handed over from the bootloader to a standard system, which provides various types of functions such as a copying function, a printing function, a scanning function, or the like. On the other hand, when activated in an update mode that updates a program such as the bootloader, processing is handed over from the bootloader to a safe system, which performs a program updating process.

Both the standard system and the safe system are activated in a manner inheriting the hardware setting which has been set by the bootloader. On this occasion, any inconsistency in the combination of the version of the bootloader and the version of the standard system or the safe system may cause a hardware failure. As a result, it may be necessary to replace the board of the image forming apparatus, for example. Japanese Patent Laid-Open No. 2019-20798 discloses a technique that holds a table including combinations of program versions and, by referring to the table in an updating process of a program, prevents updating into any combination of versions exhibiting an inconsistency.

In addition, there is known an automatic restoration function which realizes security enhancement of the image forming apparatus. The automatic restoration function is one that, by doubly holding a target program as a Master used in normal operation and a duplicate backup of the Master referred to as a Golden Copy (GC), allows restoration of the Master using the GC. For example, in a case where the Master program is illegally tampered or damage in the Master program data is unintentionally generated, the automatic restoration function restores the program (Master) detected to be abnormal from the GC.

When performing an updating process of a program in an image forming apparatus having an automatic restoration function, the GC is updated along with updating the Master for each program (for each of the bootloader, the standard system, and the safe system). However, depending on the order of updating the programs, there may occur an inconsistency in the combination of the version of the bootloader and the version of the standard system or safe system when the updating process is interrupted due to power failure or the like and subsequently powered-on again.

SUMMARY OF THE INVENTION

Accordingly, the present invention provides a technique that prevents occurrence, due to interruption of the updating process, of an inconsistency in versions of a plurality of programs to be updated in an information processing apparatus having a function of restoring a program using a backup thereof.

According to one aspect of the present invention, there is provided an information processing apparatus comprising: a first storage unit configured to store a boot program, and a backup of the boot program; a second storage unit configured to store an updating program that is activated by the boot program and used for updating a program; and a control unit configured to execute a first updating process that updates at least the boot program by executing the updating program after executing the boot program, and execute, in accordance with completion of the first updating process, a second updating process that updates at least the backup of the boot program and the updating program after executing the updated boot program.

According to another aspect of the present invention, there is provided a control method of an information processing apparatus that comprises a first storage unit configured to store a boot program, and a backup of the boot program, and a second storage unit configured to store an updating program that is activated by the boot program and used for updating a program, the control method comprising: executing a first updating process that updates at least the boot program by executing the updating program after executing the boot program, and executing, in accordance with completion of the first updating process, a second updating process that updates at least the backup of the boot program and the updating program after executing the updated boot program.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Image Forming Apparatus

Figure 1:
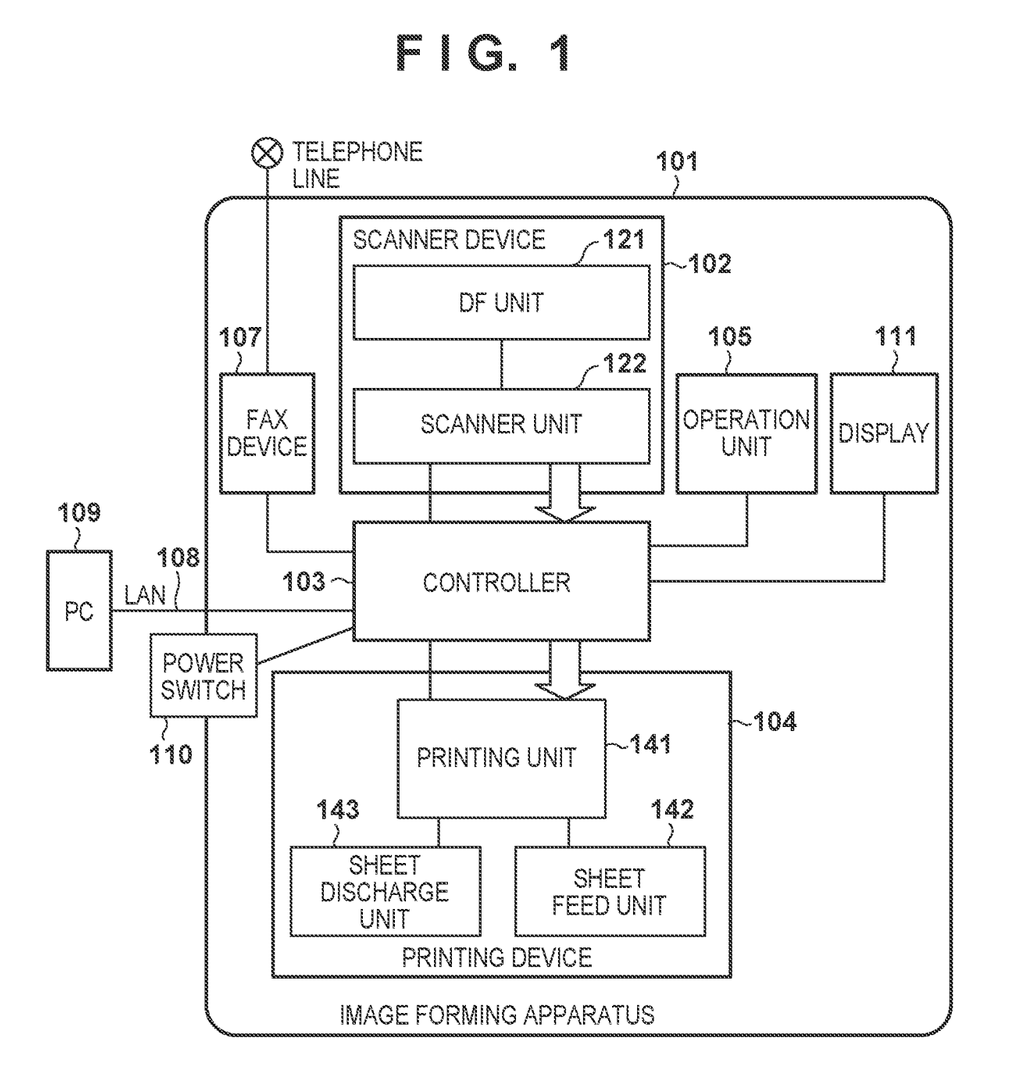
FIG. 1 is a block diagram illustrating an exemplary configuration of an image forming apparatus.

FIG. 1 is a block diagram illustrating an exemplary configuration of an image forming apparatus according to the present embodiment. An image forming apparatus 101 illustrated in FIG. 1 is an example of the information processing apparatus of the present disclosure. In the present embodiment, the image forming apparatus 101 includes a Multi Functional Peripheral (MFP) having a plurality of functions such as a printing function, a scanning function, a copying function, a data communication function, or the like. The image forming apparatus 101 can communicate with an external device such as one or more Personal Computers (PCs) 109 via a LAN 108. The image forming apparatus 101 can receive various types of jobs and instructions from the external device via the LAN 108. In addition, the image forming apparatus 101 can transmit and receive image data to and from the external device via the LAN 108.

The image forming apparatus 101 includes a controller 103, and a scanner device 102, a printing device 104, an operation unit 105, a facsimile (FAX) device 107 and a display 111, which are connected to the controller 103. The controller 103 executes a job on the image forming apparatus 101 by controlling the operation of each of the connected devices.

The scanner device 102 optically reads an image from an original document, converts the image into a digital image (image data), and outputs the converted data. The scanner device 102 includes an original document feed unit 121 and a scanner unit 122. The original document feed unit 121 has a function of separating original documents one by one from a preliminarily set bundle of original documents and feeding the original documents to the scanner unit 122. The scanner unit 122 optically reads (scans) an original document and converts it into a digital image. The scanner unit 122 outputs the converted digital image (image data) to the controller 103.

The printing device 104 prints an image on a sheet based on the input image data. The printing device 104 includes a printing unit 141, a sheet feed unit 142, and a sheet discharge unit 143. The sheet feed unit 142 separates sheets one by one from a preliminarily set stack of sheets and feeds the sheets to the printing unit 141. The printing unit 141 prints an image on a sheet fed from the sheet feed unit 142, based on the image data input from the controller 103. A sheet discharge unit 143 discharges the sheet having an image formed thereon by the printing unit 141 to the outside of the image forming apparatus 101.

Here, a finisher device may be connected to the image forming apparatus 101. In such a case, the sheet discharged by the sheet discharge unit 143 is sent to the finisher device. The finisher device performs post-processing (a finishing process) such as discharging (stacking), sorting, stapling, punching, cutting, or the like.

An operation unit 105, including an input device for receiving operations by a user, functions as a user interface via which the user performs operations on the image forming apparatus 101. The input device includes a touch panel provided on the display 111, and hard keys such as a power saving button, a copy button, a cancel button, a reset button, a numeric keypad, and a user-mode key.

The display 111 displays various types of screens such as a screen indicating an operation status of the image forming apparatus 101, a screen for receiving settings of the image forming apparatus 101, or the like. The FAX device 107 performs FAX communication for transmitting and receiving image data to and from an external device via a communication line such as a telephone line.

The image forming apparatus 101 further includes a power switch 110 that can be operated by the user. The power switch 110 is connected to the controller 103. While the power switch 110 is ON, power is supplied at least to the operation unit 105 and a part of the main board of the controller 103. In addition, when the power switch 110 is turned OFF, supply of power to the parts other than those required to turn ON the power switch 110 is terminated, after a termination process of the software and the hardware is completed.

The image forming apparatus 101 can execute at least the following functions (jobs).

Copying Function:

A function of printing an image on a sheet using the printing devices 104, based on image data obtained by reading an image of an original document by the scanner device 102.

Image Printing Function:

A function of printing an image on a sheet using the printing devices 104, based on image data received from an external device such as the PC 109.

Image Transmission Function:

A function of transmitting image data obtained by reading an image of an original document by the scanner device 102 to an external device such as the PC 109 via the LAN 108.

Image Storing Function:

A function of storing an image data obtained by reading the image of the original document by the scanner device 102 in a storage device (storage device 206, etc.) in the controller 103, and rendering the data available by the image transmission function or the image printing function as necessary.

<Controller>

Figure 2:
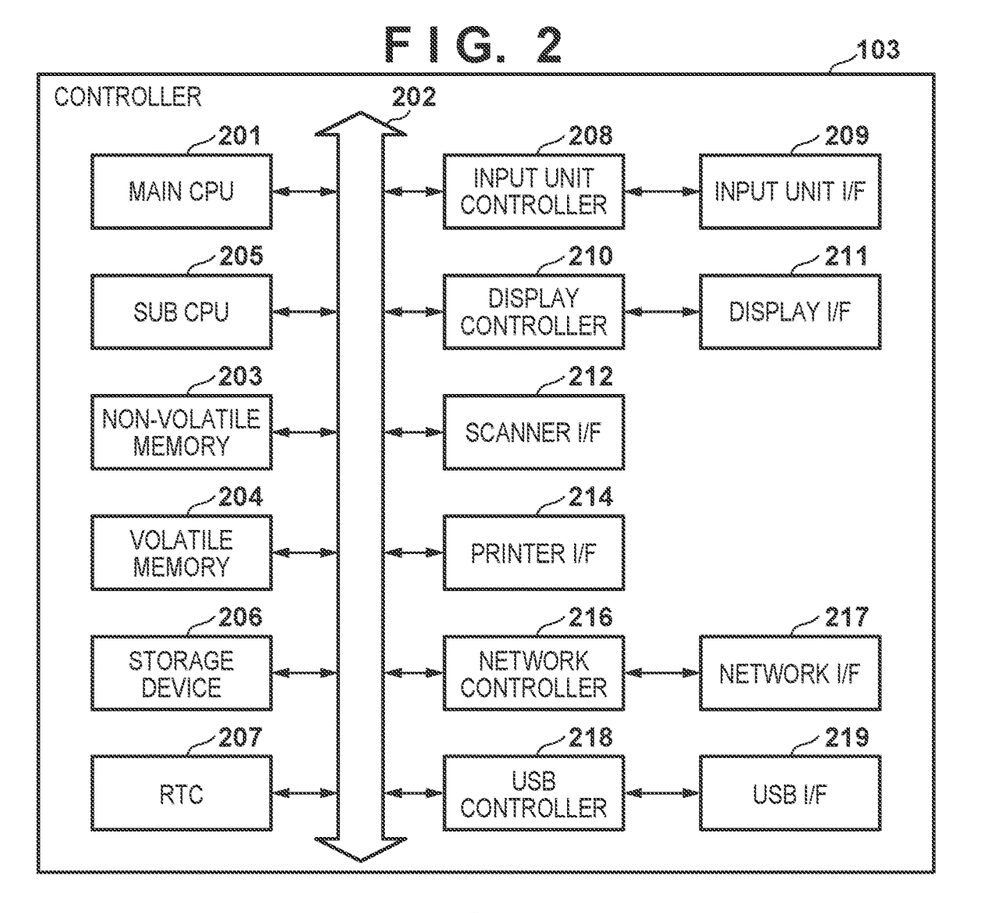
FIG. 2 is a block diagram illustrating an exemplary hardware configuration of a controller.

FIG. 2 is a block diagram illustrating an exemplary hardware configuration of the controller 103 of the image forming apparatus 101. The controller 103 includes a main CPU 201, a sub-CPU 205, a non-volatile memory 203, a volatile memory 204, a storage device 206, a real-time clock (RTC) 207, an input unit controller 208, a display controller 210, a printer interface (I/F) 214, a network controller 216, and a USB controller 218. The devices are accessible to each other via a system bus 202. The controller 103 further includes an input unit I/F 209, a display I/F 211, a network I/F 217, and a USB I/F 219.

The controller 103 includes two central processing units (main CPU 201 and sub-CPU 205). The main CPU 201 executes a control program of the image forming apparatus 101 to control the operation of the image forming apparatus 101. The main CPU 201 loads, into the volatile memory 204, and executes programs stored in the non-volatile memory 203 or the storage device 206. The non-volatile memory 203 is an SPI flash (flash memory), for example. The storage device 206 is an eMMC, for example.

The sub-CPU 205 has a function of, in a case where the image forming apparatus 101 is in a power saving mode, monitoring for an interruption from respective devices (hardware), and waking up the main CPU 201 in response to occurrence of an interruption. The RTC 207 is used to realize functions such as a clocking function, an alarm function and a timer function of the image forming apparatus 101.

The input unit controller 208 communicates with the operation unit 105 via the input unit I/F 209 to receive an input from the user via the operation unit 105.

The display controller 210 performs display control on the display 111 via the display I/F 211. The controller 103, being connected to the scanner device 102 via the scanner I/F 212, is connected to the printing device 104 via the printer I/F 214.

The network controller 216 controls communication between the image forming apparatus 101 and an external device via the network I/F 217. The USB controller 218 controls communication between the image forming apparatus 101 and the USB device via the USB I/F 209. Here, the controller 103 may include one or more USB I/Fs 219.

<Automatic Restoration Function>

The image forming apparatus 101 of the present embodiment has an automatic restoration function which realizes security enhancement of the image forming apparatus. The target program of the automatic restoration function is doubly held as a Master used in normal operation and a duplicate backup of the Master referred to as a Golden Copy (GC). When an abnormality is detected in the program due to illegal tampering of the program or unintentional damage of the program data, the automatic restoration function restores the program detected to be abnormal from the corresponding GC (backup).

In the image forming apparatus, generally, updating of a program is performed by the following procedure:
(1) starting the safe system,
(2) updating the standard system and the bootloader by the safe system, and
(3) after reactivation, updating the safe system by the standard system.

According to the aforementioned procedure, an older version of the bootloader and the safe system is used when activating the safe system. In addition, a new version of the bootloader and the standard system is used when activating the standard system.

When performing the program updating process in an image forming apparatus having the automatic restoration function described above, updating of the GC is performed along with updating of the Master for each program (for each of the bootloader, the standard system, and the safe system). In such a case, the updating process is performed as follows, for example. The bootloader activates the safe system, and the safe system updates the Master and GC of the standard system, then the Master and GC of the bootloader in sequence. Furthermore, the standard system is activated by the bootloader after reactivation, and the standard system updates the Master and GC of the safe system in sequence.

However, when the updating process is interrupted midway due to unintended power down or the like while updating each program in the aforementioned sequence, there may occur an inconsistency in the combination of the version of the bootloader and the version of the standard system or the safe system. When, for example, the updating process is interrupted in a time period during which the GC of the bootloader is being updated after updating of the Master of the bootloader has been completed, the inconsistency in the combination of the version of the bootloader and the version of the safe system. Specifically, the Master of the bootloader is already updated even when updating of the GC of the bootloader is not completed, and therefore activation of the new version of bootloader is attempted. When, on the other hand, updating of the safe system is not completed, whereby an inconsistency occurs in the combination of the version of the bootloader and the version of the safe system.

Accordingly, the image forming apparatus 101 of the present embodiment is configured to perform updating of the Master and the GC of the bootloader not in succession but in a separate manner before and after reactivation the image forming apparatus 101. Specifically, in the program updating process, the main CPU 201 updates the bootloader (Master) after having updated the standard system (Master) and the GC of the standard system. Furthermore, the main CPU 201 reactivates the image forming apparatus 101, and after having updated the GC of the bootloader, updates the safe system (Master) and the GC of the safe system.

Figure 3:
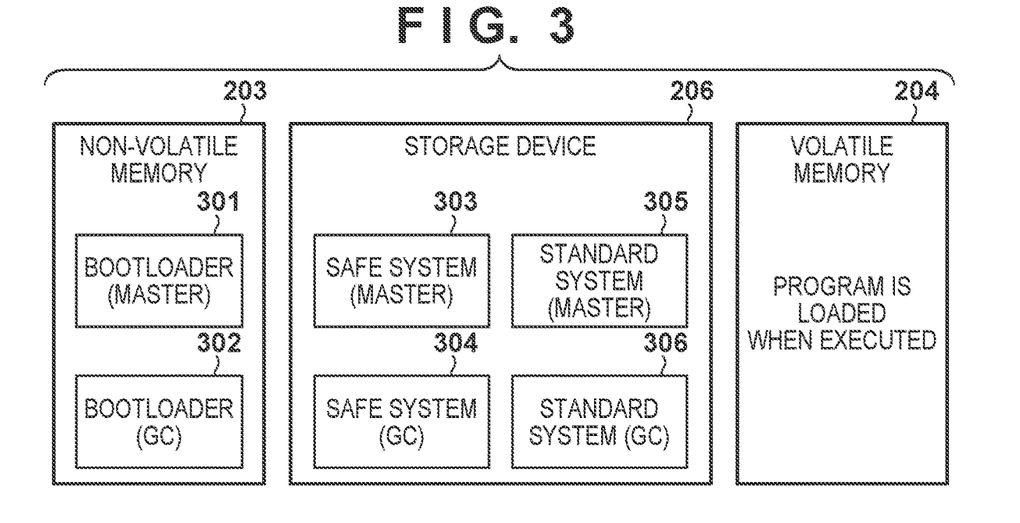
FIG. 3 illustrates an example of a target program of the automatic restoration function.

FIG. 3 illustrates an example of a target program of the automatic restoration function in the image forming apparatus 101 of the present embodiment. The bootloader is a program that is first activated (executed) when the image forming apparatus 101 is activated from the power-off state. The standard system is a program that is activated from the bootloader when activated in the normal mode. The standard system is a program for realizing respective functions (a copying function, printing, etc.,) provided by the image forming apparatus 101. The safe system is a program that is activated from the bootloader when activated in the update mode. The safe system realizes updating of the program of the image forming apparatus 101. In the present embodiment, the standard system is an example of a system program activated by the bootloader, and the safe system is an example of an updating program that is activated by the bootloader and used for updating a program.

In the present embodiment, the bootloader, the standard system, and the safe system are target programs of the automatic restoration function. Target programs of the automatic restoration function are held in the form of a Master used in normal operation and a GC (backup) that is a copy of the Master. In the example illustrated in FIG. 3, the GC 302 (backup) of the bootloader is a copy of a Master 301 of the bootloader. A GC 306 (backup) of the standard system is a copy of a Master 305 of the standard system. A GC 304 (backup) of the safe system is a copy of a Master 303 of the safe system. According to the automatic restoration function, in a case where the Master 301 of the bootloader is tampered or damaged, for example, the bootloader is restored by writing (rewriting) the GC 302 of the bootloader over the Master 301 of the bootloader.

In the example illustrated in FIG. 3, the Master 301 and the GC 302 of the bootloader are stored in the non-volatile memory 203. Although the Master 303 and the GC 304 of the safe system, and the Master 305 and the GC 306 of the standard system are stored in the storage device 206, they may be stored in the non-volatile memory 203. In addition, although the Master 303 and the GC 304 of the safe system, and the Master 305 and the GC 306 of the standard system are stored in the same storage device 206, they may be stored across several storage devices in a distributed manner.

Here, in the present specification, simply referring to a "bootloader", a "safe system", or a "standard system" intends to represent respective Masters (Masters 301, 303 and 305) thereof.

<Program Updating Process>

Figure 4:
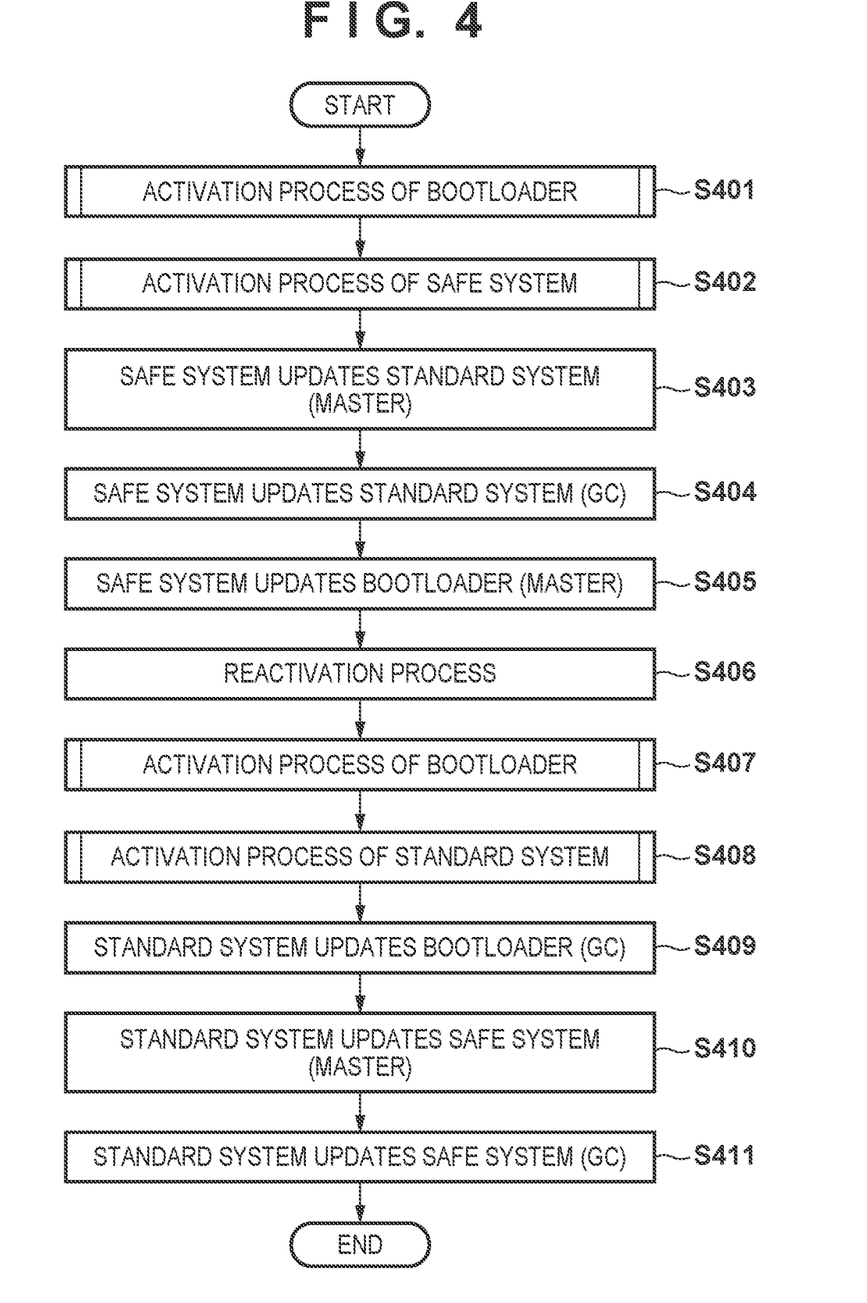
FIG. 4 is a flowchart illustrating a procedure of a program updating process (first embodiment)

FIG. 4 is a flowchart illustrating a procedure of a program updating process according to the present embodiment. This updating process is a process for updating the bootloader stored in the non-volatile memory 203 and the safe system and the standard system stored in the storage device 206 into a new version. Here, the updating program (update program) that is including a new version of the program and is intended to be used for updating each program may be downloaded from an external server apparatus and stored in the non-volatile memory 203 or the storage device 206. In addition, the updating program may be loaded from the non-volatile memory 203 or storage device 206 into the volatile memory 204 to be used for the updating process.

In the processing procedure illustrated in FIG. 4, the processing at S401 to S405 is an example of a first updating process that updates at least a boot program by executing the updating program (safe system) after executing the boot program (bootloader). In addition, the processing at S407 to S411 is an example of a second updating process that updates at least the backup of the boot program and the updating program (safe system) after executing the updated boot program (bootloader), and is executed in accordance with the completion of the first updating process.

When the image forming apparatus 101 is powered on, the main CPU 201 activates the bootloader (according to the procedure illustrated in FIG. 5) at S401. Details of the activation process of the bootloader will be described below, referring to FIG. 5. Upon completion of activation of the bootloader, the main CPU 201 then activates the safe system (according to the procedure illustrated in FIG. 6) at S402. Details of the activation process of the safe system will be described below, referring to FIG. 6. Upon completion of activation of the safe system, the main CPU 201 performs the updating process by the safe system at S403 to S405.

Specifically, at S403, the main CPU 201 causes the safe system to update the Master 305 of the standard system (i.e., the safe system updates the Master 305 of the standard system). Furthermore, at S404, the main CPU 201 causes the safe system to update the GC 306 of the standard system (i.e., the safe system updates the GC 306 of the standard system). Here, either the processing at S403 or the processing at S404 may be executed first, or alternatively, the processing at S404 may be executed prior to the processing at S403.

Upon completion of updating the standard system (Master 305 and the GC 306) at S403 and S404, the main CPU 201 advances the processing to S405. At S405, the main CPU 201 causes the safe system to update the Master 301 of the bootloader (i.e., the safe system updates the Master 301 of the bootloader). Upon completion of updating the Master 301 of the bootloader, the main CPU 201 terminates the updating process by the safe system, and performs a reactivation process at S406.

In accordance with the reactivation of the image forming apparatus 101, the main CPU 201 activates the bootloader (according to the procedure illustrated in FIG. 5), at S407. Next, at S408, the main CPU 201 activates the standard system (according to the procedure illustrated in FIG. 7). Details of the activation process of the standard system will be described below, referring to FIG. 7. Upon completion of activation of the standard system, the main CPU 201 causes the standard system to perform the updating process at S409 to S411.

Specifically, at S409, the main CPU 201 causes the standard system to update the GC 302 of the bootloader (i.e., the standard system updates the GC 302 of the bootloader). Upon completion of updating the GC 302 of the bootloader, the main CPU 201 advances the processing to S410.

At S410, the main CPU 201 causes the standard system to update the Master 303 of the safe system (i.e., the standard system updates the Master 303 of the safe system). Furthermore, at S411, the main CPU 201 causes the standard system to update the GC 304 of the safe system (i.e., the standard system updates the GC 304 of the safe system). Here, either the processing at S410 and the processing at S411 may be executed first, or alternatively, the processing at S411 may be executed prior to the processing at S410.

Upon completion of the processing at S411, the main CPU 201 terminates the updating process according to the procedure illustrated in FIG. 4. In the image forming apparatus 101 according to the present embodiment, the bootloader, the safe system, and the standard system are updated by the aforementioned processing.

<Activation Process of Bootloader>

Figure 5:
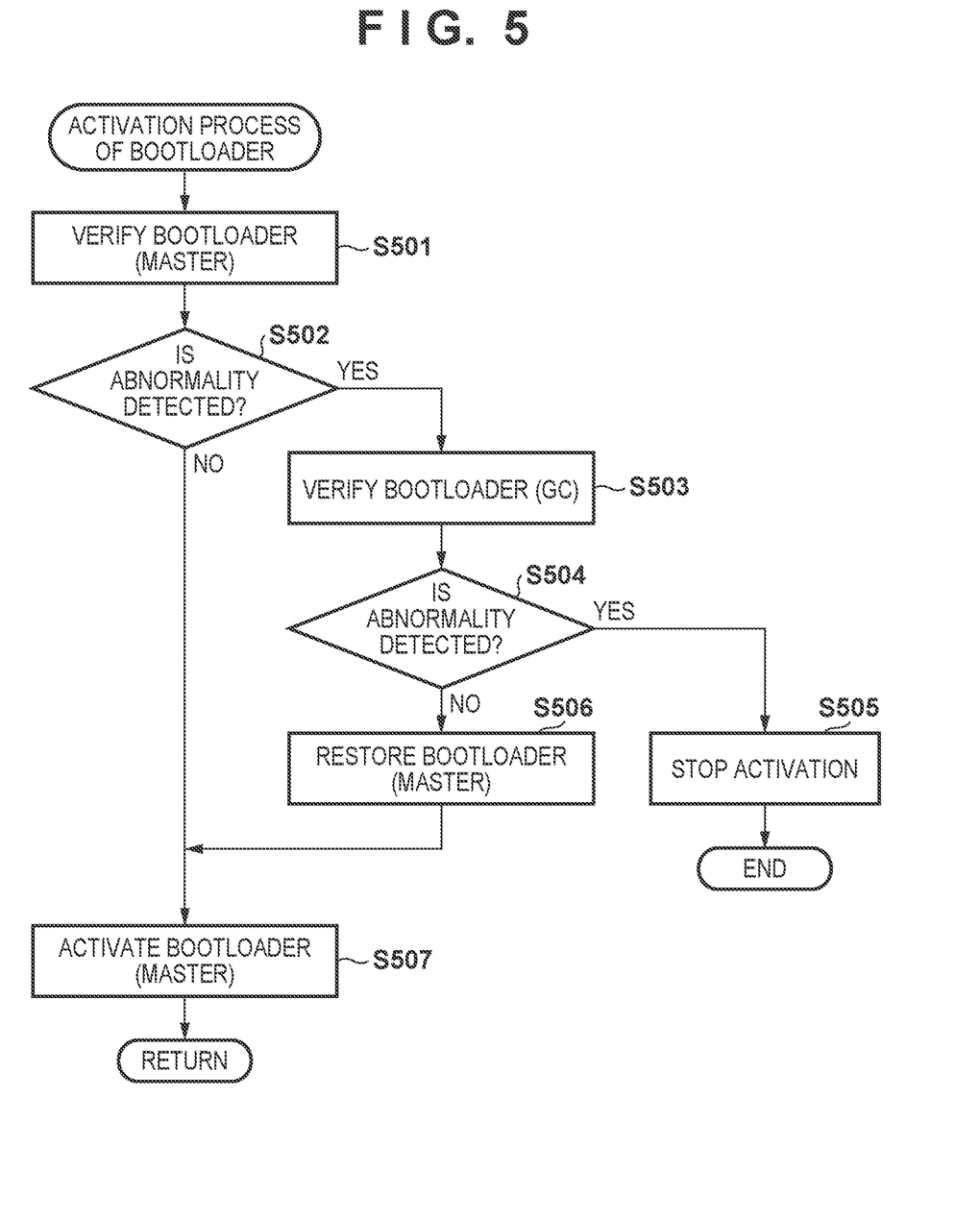
FIG. 5 is a flowchart illustrating a procedure of an activation process of a bootloader.

FIG. 5 is a flowchart illustrating a procedure of an activation process of the bootloader. When activating the bootloader, the standard system (system program) and the safe system (updating program), respectively, the main CPU 201 verifies the validity of the program to be activated. Furthermore, the main CPU 201, upon detecting an abnormality in the program to be activated, performs a process for restoring the program (Master) to be activated, using a corresponding GC (backup) stored in the non-volatile memory 203 or the storage device 206.

The main CPU 201 first verifies the validity of the Master 301 of the bootloader at S501, and determines, at S502, the verification result of S501. When not having detected any abnormality in the Master 301 of the bootloader (determined to be normal), the main CPU 201 advances the processing from S502 to S507. At S507, the main CPU 201 activates the Master 301 of the bootloader, and terminates the process according to the procedure illustrated in FIG. 5.

Upon detecting an abnormality in the Master 301 of the bootloader, the main CPU 201 advances the processing from S502 to S503. The main CPU 201 verifies the validity of the GC 302 of the bootloader at S503, and determines, at S504, the verification result of S503. When not having detected any abnormality in the GC 302 of the bootloader, the main CPU 201 advances the processing from S504 to S506. At S506, the main CPU 201 overwrites the bootloader of the Master 301 with the GC 302 of the bootloader, and advances the processing to S507. At S507, the main CPU 201 activates the Master 301 of the bootloader, and terminates the process according to the procedure illustrated in FIG. 5.

Upon detecting an abnormality also in the GC 302 of the bootloader, the main CPU 201 advances the processing from S504 to S505. At S505, the main CPU 201 terminates the activation process of the bootloader, and terminates the execution of the updating process (FIG. 4).

<Activation Process of Safe System>

Figure 6:
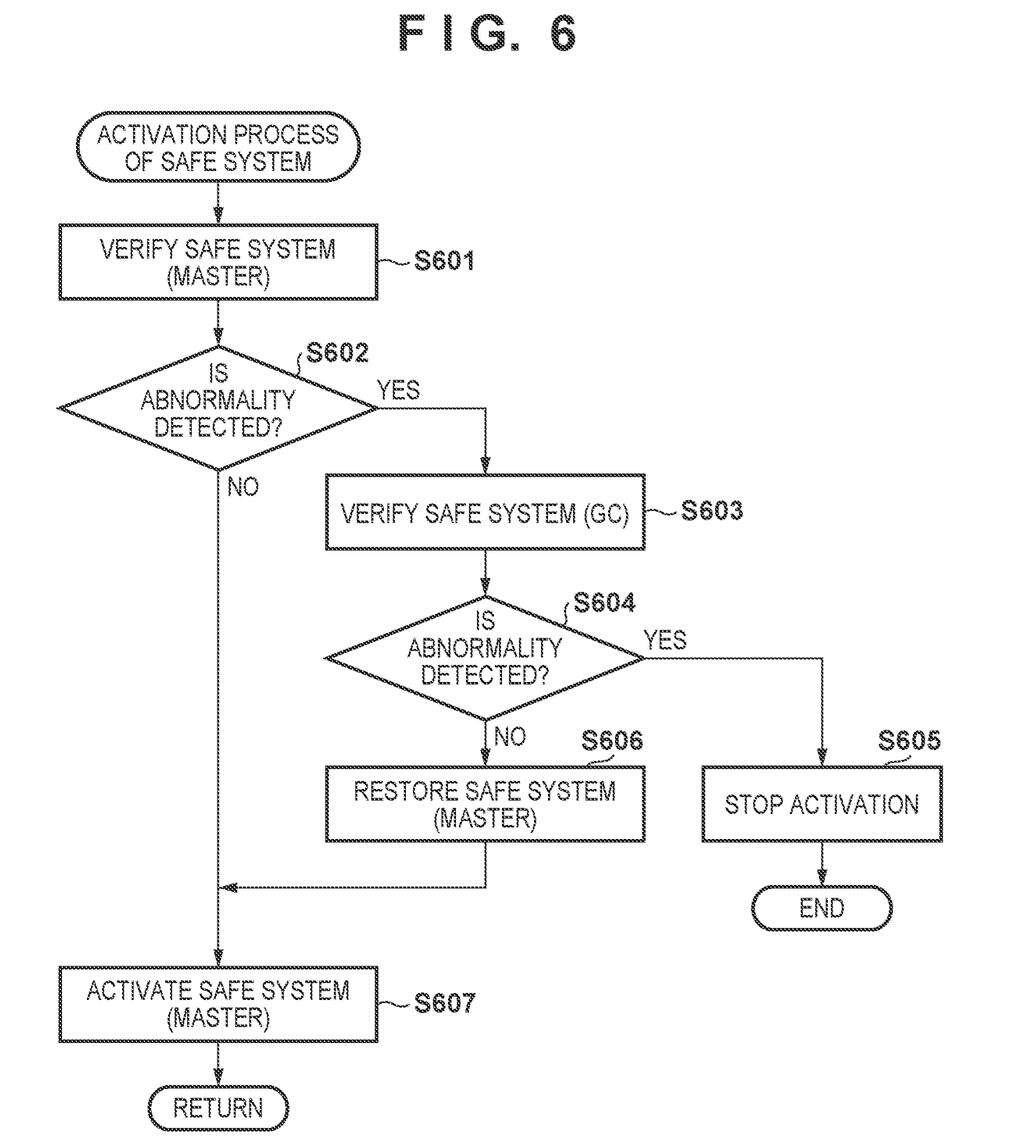
FIG. 6 is a flowchart illustrating a procedure of an activation process of a safe system.

FIG. 6 is a flowchart illustrating a procedure of an activation process of the safe system. As will be described below, the procedure is similar to the activation process of the bootloader illustrated in FIG. 5 except that the target of verification is different.

The main CPU 201 first verifies the validity of the Master 303 of the safe system at S601, and determines, at S602, the verification result of S601. When not having detected any abnormality in the Master 303 of the safe system (determined to be normal), the main CPU 201 advances the processing from S602 to S607. At S607, the main CPU 201 activates the Master 303 of the safe system, and terminates the process according to the procedure illustrated in FIG. 6.

Upon detecting an abnormality in the Master 303 of the safe system, the main CPU 201 advances the processing from S602 to S603. The main CPU 201 verifies the validity of the GC 304 of the safe system at S603, and determines, at S604, the verification result of S603. When not having detected any abnormality in the safe system, the main CPU 201 advances the processing from S604 to S606. At S606, the main CPU 201 overwrites the Master 303 of the safe system with the GC 304 of the safe system, and advances the processing to S607. At S607, the main CPU 201 activates the Master 303 of the safe system, and terminates the process according to the procedure illustrated in FIG. 6.

Upon detecting an abnormality also in the GC 304 of the safe system, the main CPU 201 advances the processing from S604 to S605. At S605, the main CPU 201 terminates the activation process of the safe system, and terminates the execution of the updating process (FIG. 4).

<Activation Process of Standard System>

Figure 7:
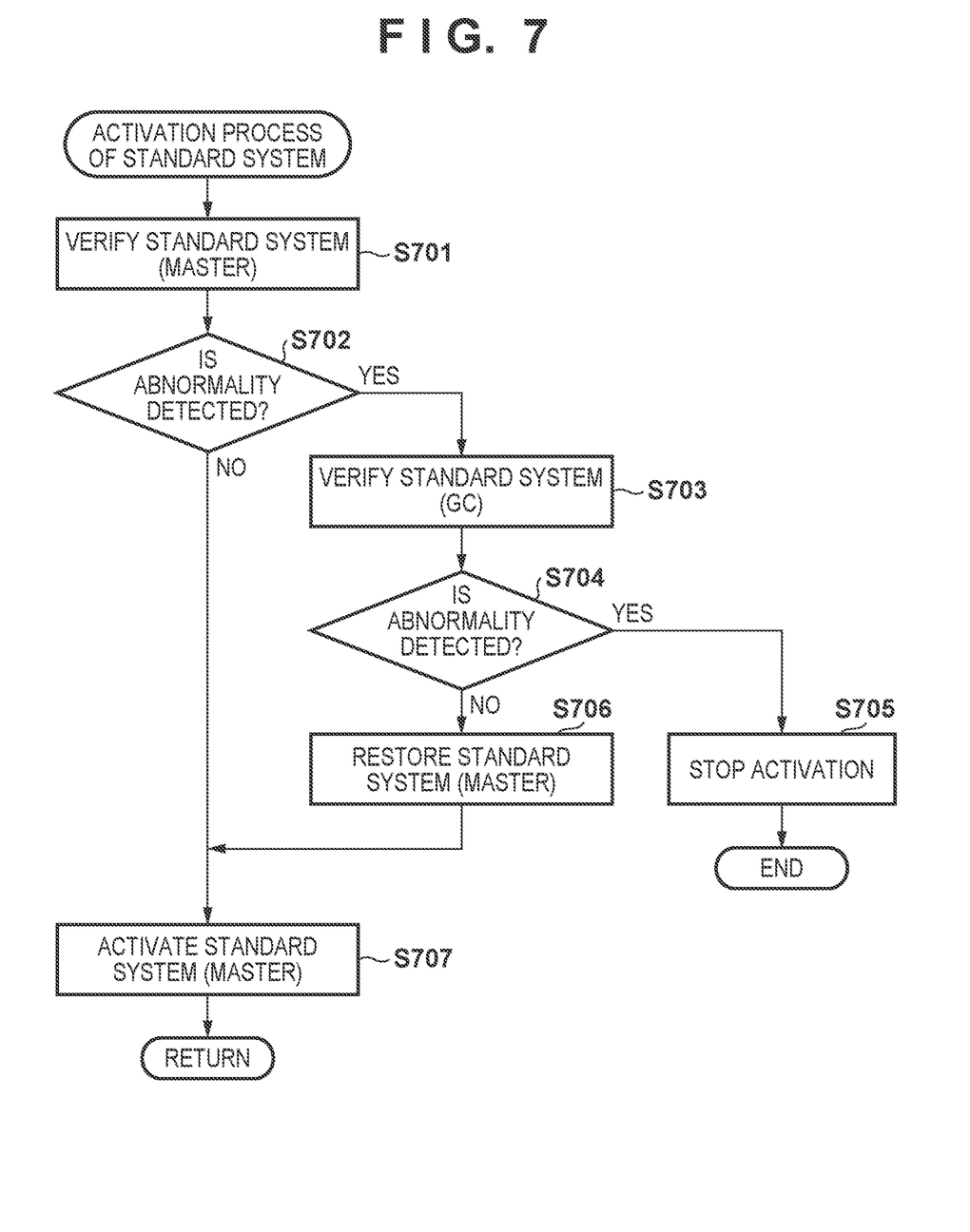
FIG. 7 is a flowchart illustrating a procedure of an activation process of a standard system.

FIG. 7 is a flowchart illustrating a procedure of an activation process of the standard system. As will be described below, the procedure is similar to the activation process of the bootloader illustrated in FIG. 5 and the activation process of the safe system illustrated in FIG. 6 except that the verification target is different.

The main CPU 201 first verifies the validity of the Master 305 of the standard system at S701, and determines, at S702, the verification result of S701. When not having detected any abnormality in the Master 305 of the standard system (determined to be normal), the main CPU 201 advances the processing from S702 to S707. At S707, the main CPU 201 activates the Master 305 of the standard system and terminates the process according to the procedure illustrated in FIG. 7.

Upon detecting an abnormality in the Master 305 of the standard system, the main CPU 201 advances the processing from S702 to S703. The main CPU 201 verifies the validity of the GC 306 of the standard system at S703, and determines, at S704, the verification result of S703. When not having detected any abnormality in the GC 306 of the standard system, the main CPU 201 advances the processing from S704 to S706. At S706, the main CPU 201 overwrites the Master 305 of the standard system with the GC 306 of the standard system, and advances the processing to S707. At S707, the main CPU 201 activates the Master 305 of the standard system, and terminates the process according to the procedure illustrated in FIG. 7.

Upon detecting an abnormality also in the GC 306 of the standard system, the main CPU 201 advances the processing from S704 to S705. At S705, the main CPU 201 terminates the activation process of the standard system, and terminates the execution of the updating process (FIG. 4).

<Time Series of Updating Process>

Figure 8:
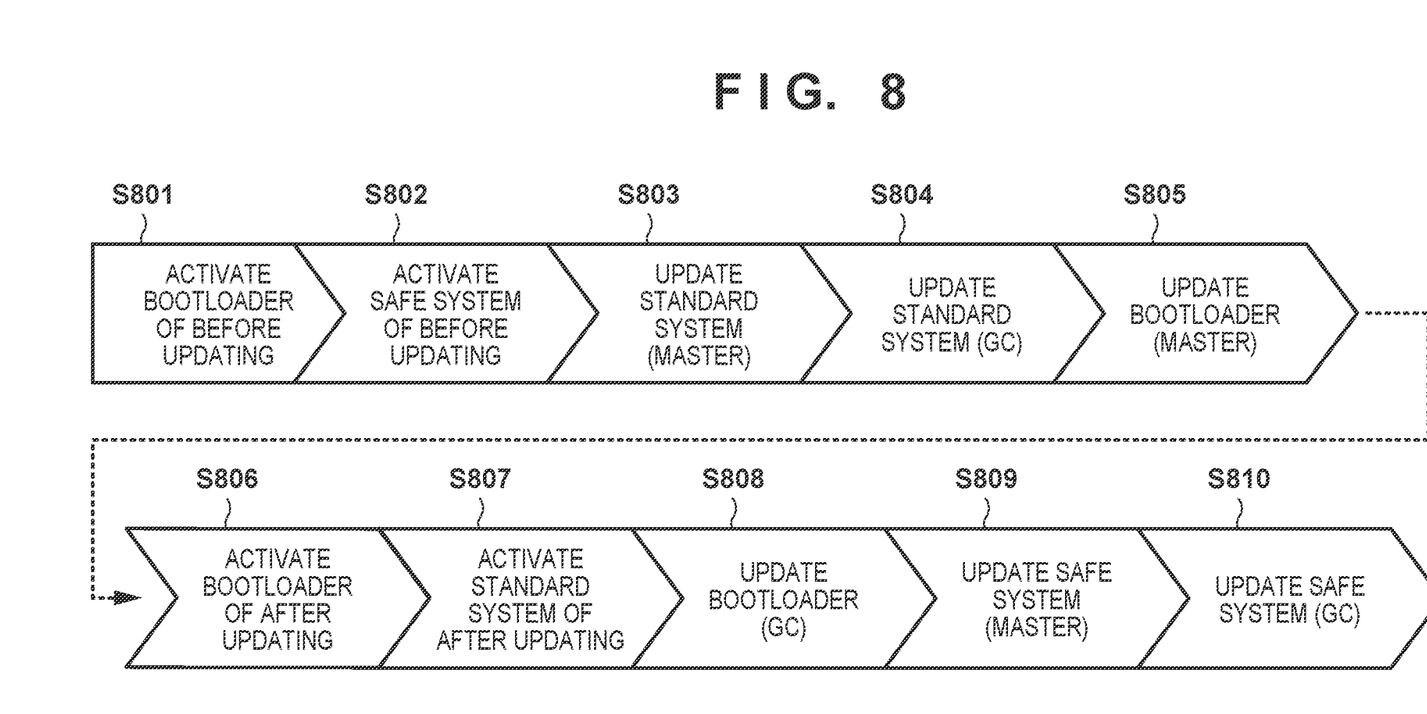
FIG. 8 illustrates an exemplary time series of an updating process (first embodiment)

FIG. 8 illustrates an example of a time series of the updating process in a case where the program updating process is performed according to the procedure illustrated in FIG. 4, and the updating process is normally completed without being interrupted midway.

First, at S801, the main CPU 201 activates the bootloader (Master 301) of before updating. After having activated the bootloader, the main CPU 201 activates, from the bootloader at S802, the safe system (Master 303) of before updating and hands over the process to the safe system. At this stage, none of the bootloader, the safe system, and the standard system is updated. Accordingly, the safe system is activated by a combination of a version of before updating of the bootloader (Master 301) and a version of before updating of the safe system (Master 303).

After having activated the safe system, the main CPU 201 (safe system) updates the Master 305 of the standard system at S803, and updates the GC 306 of the standard system at S804. Furthermore, at S805, the main CPU 201 (safe system) updates the Master 301 of the bootloader. At the completion of the processing at S805, there are three updated programs: the Master 301 of the bootloader, and the Master 305 and the GC 306 of the standard system. On the other hand, there are three programs that are not updated yet: the GC 302 of the bootloader, and the Master 303 and the GC 304 of the safe system.

Upon completion of the processing up to S805, the main CPU 201 performs a reactivation process. In accordance with the reactivation of the image forming apparatus 101, the main CPU 201 activates the bootloader (Master 301) of after updating at S806. After having activated the bootloader, the main CPU 201 activates, from the bootloader at S807, the standard system (Master 305) of after updating, and hands over the process to the standard system.

As has been described above, at the completion of the processing up to S805, both the Master 301 of the bootloader, and the Master 305 and the GC 306 of the standard system have been updated. Accordingly, there will be no inconsistency (i.e., one being a version of before updating and the other being a version of after updating) in the combination of the version of the bootloader to be activated at S806 and the version of the standard system to be activated at S807.

After having activated the standard system, the main CPU 201 (standard system) updates the GC 302 of the bootloader at S808. Furthermore, the main CPU 201 (standard system) updates the Master 303 of the safe system at S809, and updates the GC 304 of the safe system at S810. According to the aforementioned process, updating of all of the bootloader, the safe system, and the standard system is completed.

As has been described above, the image forming apparatus 101 of the present embodiment includes the non-volatile memory 203 (first storage unit) and the storage device 206 (second storage unit). The non-volatile memory 203 stores the bootloader and a backup of the bootloader. The storage device 206 stores a system program (standard system) to be activated by the bootloader, a backup of the system program, an updating program (safe system) to be activated by the bootloader and used for updating programs, and a backup of the updating program. The main CPU 201 activates the bootloader in accordance with the activation of the image forming apparatus 101, and activates the system program or the updating program from the bootloader. In the updating process using the updating program, the main CPU 201 activates the updating program from the bootloader, and updates, by the updating program, the system program, the backup of the system program, and the bootloader. Subsequently, the main CPU 201 reactivates the image forming apparatus 101, activates the system program from the bootloader, and updates, by the system program, the updating program, the backup of the updating program, and the backup of the bootloader.

Accordingly, it becomes possible to prevent occurrence, due to interruption of the updating process, of an inconsistency in versions of a plurality of programs to be updated in the information processing apparatus having a function of restoring a program using a backup thereof. Accordingly, it becomes possible to reduce the possibility of occurrence of hardware failure due to inconsistency in a combination of the version of the bootloader and the version of the standard system or the safe system.

Second Embodiment

In the first embodiment, there has been described an example in which updating of the GC 302 (backup) of the bootloader to be performed after reactivation of the image forming apparatus 101 is performed by the standard system. In a second embodiment, there will be described, as a modification example of the first embodiment, an example in which updating of the GC 302 of the bootloader is performed by the bootloader (Master 301) which has been activated in accordance with the reactivation of the image forming apparatus 101. In the following, only the parts that are different from the first embodiment will be mainly described for simplicity.

Figure 9:
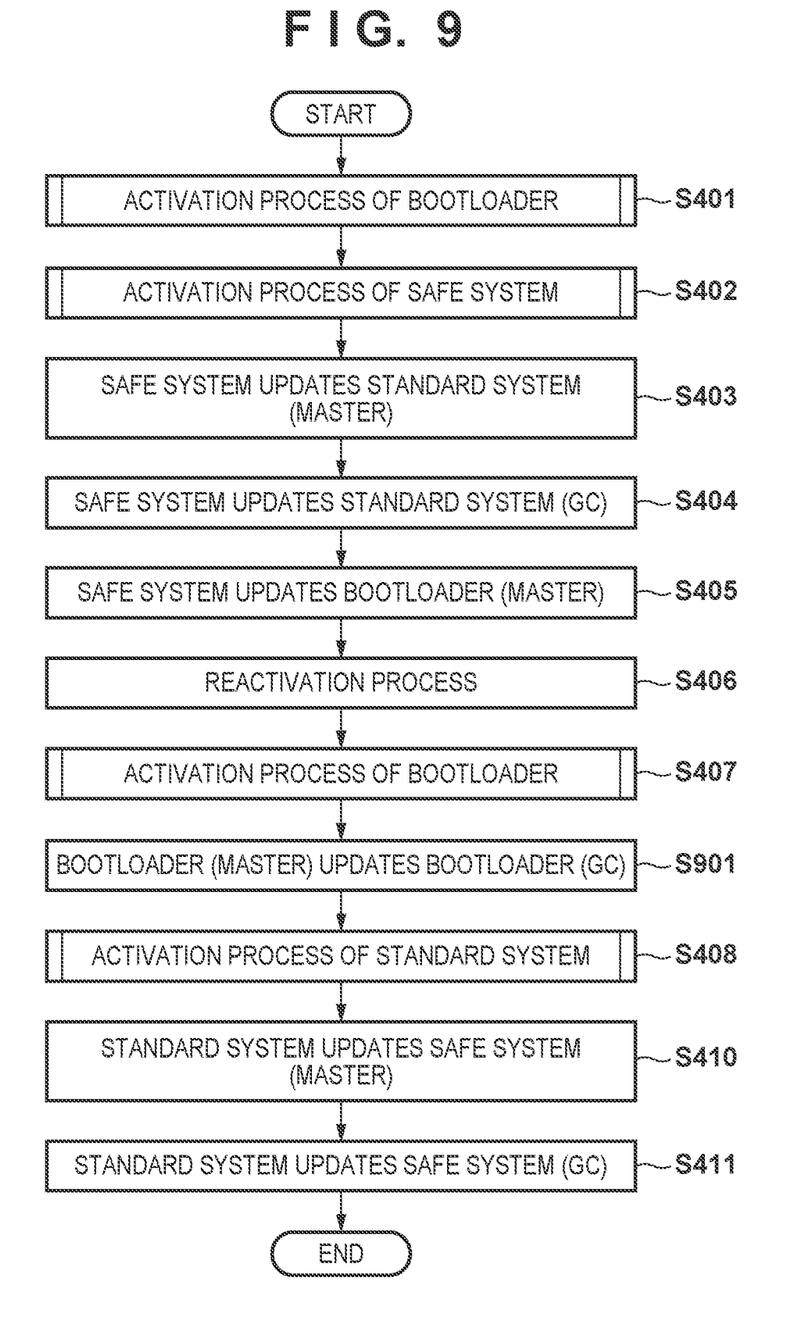
FIG. 9 is a flowchart illustrating a procedure of a program updating process (second embodiment).

FIG. 9 is a flowchart illustrating a procedure of a program updating process according to the present embodiment. As illustrated in FIG. 9, the processing at S401 to S407 is similar to that of the first embodiment (FIG. 4). In the processing procedure illustrated in FIG. 9, the processing at S401 to S405 is an example of the first updating process that updates at least the boot program by executing the updating program (safe system) after executing the boot program (bootloader). In addition, the processing at S407, S901, S408, S410 and S411 is an example of the second updating process that updates at least the backup of the boot program and the updating program (safe system) after executing the updated boot program (bootloader), and is executed in accordance with the completion of the first updating process.

In the present embodiment, the main CPU 201 advances the processing from S407 to S901, upon completion of the activation of the bootloader (Master 301).

At S901, the main CPU 201 causes the activated bootloader to perform updating of the GC 302 of the bootloader stored in the non-volatile memory 203 (i.e., the activated bootloader updates the GC 302 of the bootloader). Subsequently, at S408, the main CPU 201 activates the standard system by the bootloader (according to the procedure illustrated in FIG. 7), and advances the processing to S410.

At S410 and S411, the main CPU 201 causes the standard system to update the Master 303 and the GC 304 of the safe system (i.e., the standard system updates the Master 303 and the GC 304 of the safe system). Here, either the processing at S410 and the processing at S411 may be executed first, or alternatively, the processing at S411 may be executed prior to the processing at S410.

As has been described above, the image forming apparatus 101 of the present embodiment includes the non-volatile memory 203 (first storage unit) and the storage device 206 (second storage unit). The non-volatile memory 203 stores the bootloader and a backup of the bootloader. The storage device 206 stores a system program (standard system) to be activated by the bootloader, a backup of the system program, an updating program (safe system) to be activated by the bootloader and used for updating programs, and a backup of the updating program. The main CPU 201 activates the bootloader in accordance with the activation of the image forming apparatus 101, and activates the system program or the updating program from the bootloader. In the updating process using the updating program, the main CPU 201 activates the updating program from the bootloader, and updates, by the updating program, the system program, the backup of the system program, and the bootloader. Subsequently, the main CPU 201 reactivates the image forming apparatus 101, updates the backup of the bootloader by the bootloader, activates the system program from the bootloader, and updates, by the system program, the updating program and the backup of the updating program.

Accordingly, it becomes possible to prevent occurrence, due to interruption of the updating process, of an inconsistency in versions of a plurality of programs to be updated in the information processing apparatus having a function of restoring a program using a backup thereof. Accordingly, it becomes possible to reduce the possibility of occurrence of hardware failure due to inconsistency in a combination of the version of the bootloader and the version of the standard system or the safe system.

According to the first and second embodiments described above, the information processing apparatus according to an aspect can be configured as follows. The information processing apparatus includes a first storage unit (non-volatile memory 203) configured to store a boot program (bootloader) and a backup of the boot program, and a second storage unit (storage device 206) configured to store the updating program (safe system) to be used for updating programs, and a control unit (main CPU 201). The control unit executes the first updating process that updates at least the boot program by executing the updating program (safe system) after executing the boot program (bootloader). Subsequently, the control unit executes the second updating process that updates at least the backup of the boot program and the updating program after executing the updated boot program (bootloader), in accordance with the completion of the first updating process. The control unit may reactivate the information processing apparatus and execute the second updating process after completing the first updating process. According to the foregoing aspect, it becomes possible to prevent occurrence, due to interruption of the updating process, of an inconsistency in versions of a plurality of programs to be updated in the information processing apparatus having a function of restoring a program using a backup thereof. For example, even when power down occurs immediately after completion of the updating of the boot program, the first updating process has been completed at that time point, which can ensure operation of the information processing apparatus after reactivation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-090590, filed May 28, 2021, which is hereby incorporated by reference herein in its entirety.

What is claimed is:

1. An information processing apparatus comprising:
a controller including a main CPU, a sub CPU, a non-volatile memory and a storage device, wherein
the non-volatile memory is configured to store a boot program, and a backup of the boot program,
the storage device is configured to store an updating program that is activated by the boot program and used for updating a program, and
the controller is configured to:
execute a first updating process that updates at least the boot program by executing the updating program after executing the boot program, and execute, in response to the completion of the first updating process, a second updating process that updates at least the backup of the boot program and updates the updating program after executing the updated boot program,
wherein
the storage device further stores a system program that is activated by the boot program, and a backup of the system program, and
the controller is configured to update, by the updating program in the first updating process, the system program, the backup of the system program, and the boot program,
wherein
the storage device further stores a backup of the updating program, and
the controller is configured to activate, in the second updating process, the system program from the boot program and update, by the system program, the updating program, the backup of the updating program, and the backup of the boot program, and
wherein the controller is configured to perform, in the first updating process, updating of the boot program after updating the system program and the backup of the system program and perform, in the second updating process, updating of the updating program and the backup of the updating program after updating the backup of the boot program.

2. The information processing apparatus according to claim 1, wherein the controller is configured to reactivate the information processing apparatus after completion of the first updating process, and execute the second updating process.

3. The information processing apparatus according to claim 1, wherein
the storage device further stores a backup of the updating program, and,
the controller is configured to update, by the boot program in the second updating process, the backup of the boot program, activate the system program from the boot program, and update, by the system program, the updating program and the backup of the updating program.

4. The information processing apparatus according to claim 1, wherein the controller is configured to verify validity of a program to be activated, when activating each of the boot program, the updating program, and the system program and, upon detecting an abnormality in the program to be activated, perform a process for restoring the program to be activated, using a corresponding backup stored in the non-volatile memory or the storage device.

5. The information processing apparatus according to claim 4, wherein the controller is configured to, upon detecting an abnormality in the program to be activated, further verify validity of the corresponding backup stored in the non-volatile memory or the storage device and, in a case where the corresponding backup is normal, restore the program to be activated, using the corresponding backup.

6. The information processing apparatus according to claim 5, wherein the controller is configured to, upon detecting an abnormality in the corresponding program, terminate execution of the updating process.

7. The information processing apparatus according to claim 1, wherein the controller is configured to restore a program in which an abnormality is detected, by overwriting the program in which the abnormality is detected with a corresponding backup stored in the non-volatile memory or the storage device.

8. The information processing apparatus according to claim 1, wherein the system program is a program for realizing a function provided by the information processing apparatus.

9. A control method of an information processing apparatus that comprises a controller including a main CPU, a sub CPU, a non-volatile memory and a storage device, wherein the non-volatile memory is configured to store a boot program, and a backup of the boot program, and the storage device is configured to store an updating program that is activated by the boot program and used for updating a program, the control method being performed by the controller and comprising:
executing a first updating process that updates at least the boot program by executing the updating program after executing the boot program,
executing, in response to completion of the first updating process, a second updating process that updates at least the backup of the boot program and updates the updating program after executing the updated boot program;
storing, at the storage device, a system program that is activated by the boot program, and a backup of the system program;
updating, by the updating program in the first updating process, the system program, the backup of the system program, and the boot program;
storing, at the storage device, a backup of the updating program;
activating, in the second updating process, the system program from the boot program and update, by the system program, the updating program, the backup of the updating program, and the backup of the boot program; and
performing, in the first updating process, updating of the boot program after updating the system program and the backup of the system program and performing, in the second updating process, updating of the updating program and the backup of the updating program after updating the backup of the boot program.

* * * * *